United States Patent
Chen et al.

(10) Patent No.: US 12,209,202 B2
(45) Date of Patent: Jan. 28, 2025

(54) RESIN COMPOSITION AND FILTER ELEMENT

(71) Applicant: Advanced Echem Materials Company Limited, Taoyuan (TW)

(72) Inventors: Yu-Wen Chen, Taoyuan (TW); Yi-Lun Chiu, Taoyuan (TW); Chia-Hao Lou, Taoyuan (TW); Chen-Wen Chiu, Taoyuan (TW)

(73) Assignee: Advanced Echem Materials Company Limited, Taoyuan (TW)

( * ) Notice: Subject to any disclaimer, the term of this patent is extended or adjusted under 35 U.S.C. 154(b) by 0 days.

(21) Appl. No.: 18/636,294

(22) Filed: Apr. 16, 2024

(65) Prior Publication Data
US 2024/0263015 A1    Aug. 8, 2024

Related U.S. Application Data

(63) Continuation of application No. 17/143,159, filed on Jan. 7, 2021, now Pat. No. 11,999,868.

(30) Foreign Application Priority Data

Jan. 20, 2020 (TW) ................................ 109101859

(51) Int. Cl.
| | | |
|---|---|---|
| *C09D 4/06* | (2006.01) | |
| *C08F 2/50* | (2006.01) | |
| *C08F 283/08* | (2006.01) | |
| *C08F 290/06* | (2006.01) | |
| *C08G 63/197* | (2006.01) | |
| *C08K 3/04* | (2006.01) | |
| *C08K 3/08* | (2006.01) | |
| *G02B 5/20* | (2006.01) | |
| *B82Y 20/00* | (2011.01) | |
| *B82Y 30/00* | (2011.01) | |
| *B82Y 40/00* | (2011.01) | |
| *C08F 2/44* | (2006.01) | |
| *C08K 3/22* | (2006.01) | |

(52) U.S. Cl.
CPC .................. *C09D 4/06* (2013.01); *C08F 2/50* (2013.01); *C08F 283/08* (2013.01); *C08F 290/067* (2013.01); *C08G 63/197* (2013.01); *C08K 3/04* (2013.01); *C08K 3/08* (2013.01); *G02B 5/20* (2013.01); *B82Y 20/00* (2013.01); *B82Y 30/00* (2013.01); *B82Y 40/00* (2013.01); *C08F 2/44* (2013.01); *C08K 2003/0881* (2013.01); *C08K 2003/2237* (2013.01); *C08K 2201/005* (2013.01); *C09K 2323/031* (2020.08)

(58) Field of Classification Search
CPC ...... C09K 2323/031; G02B 5/20; C09D 4/06; C08F 290/067; C08F 222/1006; C08F 283/08

See application file for complete search history.

(56) References Cited

U.S. PATENT DOCUMENTS

| | | | |
|---|---|---|---|
| 11,999,868 B2* | 6/2024 | Chen et al. ......... | C08F 290/067 |
| 2011/0151379 A1* | 6/2011 | Choi et al. .............. | G03F 7/032 |
| | | | 430/270.1 |
| 2011/0170225 A1* | 7/2011 | Rogers et al. ....... | G03G 15/323 |
| | | | 347/20 |
| 2014/0011125 A1* | 1/2014 | Inoue et al. ......... | C09D 11/324 |
| | | | 430/7 |
| 2017/0102610 A1* | 4/2017 | Chiu et al. ............... | G01J 1/44 |

FOREIGN PATENT DOCUMENTS

| | | | |
|---|---|---|---|
| KR | 20150129086 A | * | 11/2015 |
| TW | I779259 B | * | 10/2022 |

* cited by examiner

*Primary Examiner* — Sophie Hon
(74) *Attorney, Agent, or Firm* — JCIPRNET

(57) ABSTRACT

A resin composition and a filter element are provided. The resin composition includes a black coloring agent (A), an ethylenically-unsaturated monomer (B), a solvent (C), a resin (D), and a photoinitiator (E). The black coloring agent (A) includes a titanium black (A-1) and a carbon black (A-2). Based on a total usage amount of 100 parts by weight of the titanium black (A-1) and the carbon black (A-2), a usage amount of the titanium black (A-1) is 50 parts by weight to 75 parts by weight.

5 Claims, No Drawings

RESIN COMPOSITION AND FILTER ELEMENT

CROSS-REFERENCE TO RELATED APPLICATION

This application is a continuation application of and claims the priority benefit of a prior application Ser. No. 17/143,159, filed on Jan. 7, 2021, which claims the priority benefit of Taiwan application no. 109101859, filed on Jan. 20, 2020. The entirety of each of the above-mentioned patent applications is hereby incorporated by reference herein and made a part of this specification.

BACKGROUND OF THE INVENTION

Field of the Invention

The invention relates to a resin composition, and more particularly, to a resin composition suitable for a filter element and a filter element.

Description of Related Art

With the vigorous development of liquid crystal display device techniques, in order to improve the energy saving effect of a liquid crystal display device, the driving frequency of the liquid crystal display device is generally reduced. However, the currently used liquid crystal display device generates flicker when operated at low frequencies, and false images may be generated in traditional electronic shuttering mode, such that complementary metal-oxide semiconductor (CMOS) image sensing elements do not work properly.

A filter element is usually used in a liquid crystal display device to alleviate the issue of flickering of the screen. However, the currently used filter element has issues such as poor resolution or poor transmittance. For example, the composition of the current filter element may produce the issue that the precipitation speed of titanium black is different from the precipitation speed of other black coloring agents, thereby affecting the performance of devices using the filter element.

SUMMARY OF THE INVENTION

Accordingly, this disclosure provides a resin composition and a filter element that may have the following characteristics: good resolution, developability, adhesion, coating uniformity, and light transmittance.

A resin composition of the invention includes a black coloring agent (A), an ethylenically-unsaturated monomer (B), a solvent (C), a resin (D), and a photoinitiator (E). The black coloring agent (A) includes a titanium black (A-1) and a carbon black (A-2). Based on a total usage amount of 100 parts by weight of the titanium black (A-1) and the carbon black (A-2), a usage amount of the titanium black (A-1) is 50 parts by weight to 75 parts by weight.

In an embodiment of the invention, a resolution of the cured film obtained by the resin composition is less than 2 microns when a thickness of the cured film is 0.3 microns to 3.0 microns.

In an embodiment of the invention, a visible light transmittance of the cured film obtained by the resin composition is 5% to 50% when a thickness of the cured film is between 0.3 microns and 3.0 microns.

In an embodiment of the invention, a particle size of the titanium black (A-1) and the carbon black (A-2) is less than 100 nm.

In an embodiment of the invention, based on a usage amount of 100 parts by weight of the resin (D), a usage amount of the black coloring agent (A) is 25 parts by weight to 430 parts by weight, a usage amount of the ethylenically-unsaturated monomer (B) is 78 parts by weight to 115 parts by weight, a usage amount of the solvent (C) is 965 parts by weight to 2550 parts by weight, and a usage amount of the photoinitiator (E) is 4 parts by weight to 12 parts by weight.

In an embodiment of the invention, the ethylenically-unsaturated monomer (B) includes at least one selected from a group consisting of a compound containing an acryloyloxy group and a compound containing a methacryloyloxy group.

In an embodiment of the invention, the ethylenically-unsaturated monomer (B) includes dipentaerythritol hexaacrylate and polyfunctional polyurethane acrylate.

In an embodiment of the invention, the ethylenically-unsaturated monomer (B) has 4 to 14 functional groups, and the functional groups include at least one of an ester group, an acyl group, an acyloxy group, and an amide group.

In an embodiment of the invention, the solvent (C) includes at least one of a compound represented by the following Formula (C-1) and a compound represented by the following Formula (C-2),

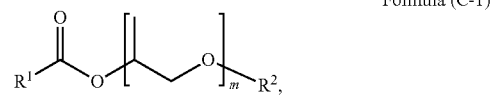

Formula (C-1)

in Formula (C-1), $R^1$ and $R^2$ are respectively an alkyl group, and m is 1 or 2,

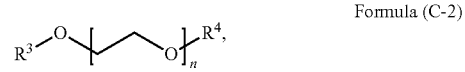

Formula (C-2)

in Formula (C-2), $R^3$ and $R^4$ are respectively an alkyl group, and n is an integer greater than or equal to 1.

In an embodiment of the invention, the resin (D) has a bisphenol fluorene structure, and a molecular weight of the resin (D) is 2000 to 20000.

In an embodiment of the invention, the resin (D) is formed by a monomer represented by the following Formula (D-1),

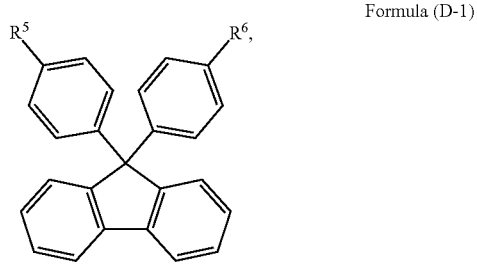

Formula (D-1)

in Formula (D-1), $R^5$ and $R^6$ are respectively a group containing a carbonyl group.

In an embodiment of the invention, the photoinitiator (E) includes an oxime-based photoinitiator (E-1) and an acetophenone-based photoinitiator (E-2). Based on a total usage amount of 100 parts by weight of the oxime-based photoinitiator (E-1) and the acetophenone-based photoinitiator (E-2), a usage amount of the oxime-based photoinitiator (E-1) is 50 parts by weight to 70 parts by weight.

A filter element of the invention is formed by the resin composition above.

Based on the above, the resin composition of the invention uses the black coloring agent (A) including the titanium black (A-1) and the carbon black (A-2), and based on a total usage amount of 100 parts by weight of the titanium black (A-1) and the carbon black (A-2), a usage amount of the titanium black (A-1) is 50 parts by weight to 75 parts by weight. Thus, when the resin composition is used to form the filter element, the filter element may have good resolution, developability, adhesion, coating uniformity, and light transmittance.

In order to make the aforementioned features and advantages of the disclosure more comprehensible, embodiments are described in detail below.

DESCRIPTION OF THE EMBODIMENTS

<Resin Composition>

The invention provides a resin composition, including a black coloring agent (A), an ethylenically-unsaturated monomer (B), a solvent (C), a resin (D), and a photoinitiator (E). In addition, the resin composition of the invention may further include an additive (F) such as a surfactant as needed. Hereinafter, the various components above are described in detail.

It should be mentioned that, in the following, (meth)acrylic acid represents acrylic acid and/or methacrylic acid, and (meth)acrylate represents acrylate and/or methacrylate.
Black Coloring Agent (A)

The black coloring agent (A) includes a titanium black (A-1) and a carbon black (A-2). However, the invention is not limited thereto, and the black coloring agent (A) may also include an organic black pigment (for example, lactam-based organic black, RGB black, RVB black, etc.), an inorganic black pigment (for example, aniline black, perylene black, cyanine black, lignin black, etc.), a combination of the above black pigments, or other suitable black coloring agents.

The particle size of the titanium black (A-1) and the particle size of the carbon black (A-2) are not particularly limited, and a suitable particle size may be selected based on needs, and preferably is less than 100 nm.

The usage amount of the black coloring agent (A) is 25 parts by weight to 430 parts by weight based on a usage amount of 100 parts by weight of the resin (D).

Based on a total usage amount of 100 parts by weight of the titanium black (A-1) and the carbon black (A-2), the usage amount of the titanium black (A-1) is 50 parts by weight to 75 parts by weight, preferably 50 parts by weight to 70 parts by weight, and more preferably 50 parts by weight to 66 parts by weight.

When the resin composition contains the black coloring agent (A) including the titanium black (A-1) and the carbon black (A-2), and the usage amount of the titanium black (A-1) is within the above range, the cured film formed by the resin composition may have good resolution, developability, adhesion, coating uniformity, and light transmittance, and may be applied to a filter element. At the same time, when the particle sizes of the titanium black (A-1) and the carbon black (A-2) are less than 100 nm, the cured film and the filter element formed by the resin composition may have better resolution.

Ethylenically-Unsaturated Monomer (B)

In the present embodiment, the ethylenically-unsaturated monomer (B) may include at least one selected from a group consisting of a compound containing an acryloyloxy group and a compound containing a methacryloyloxy group. In other embodiments, the ethylenically-unsaturated monomer (B) may have 4 to 14 functional groups, preferably 6, 10, or 10 or more functional groups, wherein the functional groups include at least one of an ester group, an acyl group, an acyloxy group, and an amide group, preferably at least one of an acyloxy group and an amide group.

For example, the ethylenically-unsaturated monomer (B) may include the compound represented by the following Formula (B-1), dipentaerythritol hexaacrylate (DPHA), polyfunctional polyurethane acrylate (trade name: DPHA-40H, manufactured by Nippon Kayaku Co., Ltd.), ethylene glycol di(meth)acrylate, diethylene glycol di(meth)acrylate, tetraethylene glycol di(meth)acrylate, propylene glycol di(meth)acrylate, polypropylene glycol di(meth)acrylate, butanediol di(meth)acrylate, neopentyl glycol di(meth)acrylate, 1,6-hexanediol di(meth)acrylate, trimethylolpropane tri(meth)acrylate, pentaerythritol triacrylate, pentaerythritol tetraacrylate, dipentaerythritol pentaacrylate, pentaerythritol di(meth)acrylate, pentaerythritol tri(meth)acrylate, pentaerythritol tetra(meth)acrylate, dipentaerythritol penta(meth)acrylate, dipentaerythritol hexa(meth)acrylate, 2,2-bis(4-(meth)acryloxydiethoxyphenyl)propane, 2,2-bis(4-(meth)acryloxypolyethoxyphenyl)propane, 2-hydroxy-3-(meth)acryloxypropyl (meth)acrylate, ethylene glycol diglycidyl ether di(meth)acrylate, diethylene glycol diglycidyl ether di(meth)acrylate, diglycidyl phthalate di(meth)acrylate, glycerol triacrylate, glycerol polyglycidyl ether poly(meth)acrylate, urethane (meth)acrylate, a reactant of trimethylhexamethylene diisocyanate, hexamethylene diisocyanate, and 2-hydroxyethyl (meth)acrylate, N,N'-methylenebis(meth)acrylamide, (meth)acrylamide methylene ether, a condensate of polyol and N-hydroxymethyl (meth)acrylamide, triacrylate dimethyl acetal, or other suitable monomers, preferably including dipentaerythritol hexaacrylate and polyfunctional polyurethane acrylate (trade name: DPHA-40H, manufactured by Nippon Kayaku Co., Ltd.) The ethylenically unsaturated monomer (B) may be used alone or in combination.

Formula (B-1)

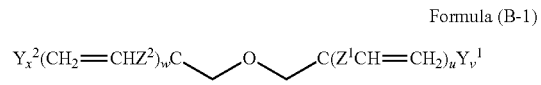

In formula (B-1), $Z^1$ and $Z^2$ are respectively a divalent group having acyloxylene, and $Y^1$ and $Y^2$ are respectively a hydroxyl-substituted alkyl group or a similar functional group, u and w are respectively integers of 1 to 3, v and x are respectively integers of 0 to 2, the sum of u and v is 3, and the sum of w and x is 3.

Preferred specific examples of the compound represented by Formula (B-1) may include dipentaerythritol hexaacrylate, dipentaerythritol pentaacrylate, and the like.

Based on a usage amount of 100 parts by weight of the resin (D), the usage amount of the ethylenically-unsaturated monomer (B) is 78 parts by weight to 115 parts by weight, preferably 85 parts by weight to 104 parts by weight, and more preferably 86 parts by weight to 100 parts by weight.

When the ethylenically-unsaturated monomer (B) in the resin composition has 4 to 14 functional groups, wherein the functional group includes at least one of an ester group, an acyl group, an acyloxy group, and an amide group, the cured film and the filter element formed by the resin composition have better adhesion and resolution. In addition, when the usage amount of the ethylenically-unsaturated monomer (B) is within the above range, the cured film and the filter element formed by the resin composition may have better adhesion, resolution, and developability.

Solvent (C)

The solvent (C) is not particularly limited, and a suitable solvent may be selected according to needs. The solvent (C) may include at least one of a compound represented by the following Formula (C-1) and a compound represented by the following Formula (C-2). The solvent (C) may be used alone or in combination.

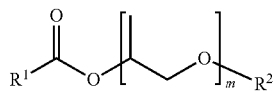

Formula (C-1)

In Formula (C-1), $R^1$ and $R^2$ are respectively an alkyl group, and m is 1 or 2.

In Formula (C-1), $R^1$ and $R^2$ are preferably a C1 to C5 alkyl group, respectively, and are more preferably a methyl group, respectively. Preferred specific examples of the compound represented by Formula (C-1) include propylene glycol methyl ether acetate (PMA or PGMEA), dipropylene glycol methyl ether acetate (DPMA or DPGMEA), and the like. The compound represented by Formula (C-1) may be used alone or in combination.

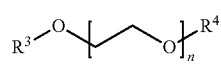

Formula (C-2)

In formula (C-2), $R^3$ and $R^4$ are respectively an alkyl group, and n is an integer greater than or equal to 1.

In Formula (C-2), $R^3$ and $R^4$ are preferably a C1 to C6 alkyl group, respectively, and are more preferably a methyl group, respectively, and n is preferably an integer of 1 to 2. Preferred specific examples of the compound represented by Formula (C-2) include PGMEA and the like. The compound represented by Formula (C-2) may be used alone or in combination.

Based on a usage amount of 100 parts by weight of the resin (D), the usage amount of the solvent (C) is 965 parts by weight to 2550 parts by weight, preferably 1000 parts by weight to 2500 parts by weight.

When the solvent (C) in the resin composition includes the compound represented by Formula (C-2), the precipitation speed of particles in the resin composition may be improved, such that the resulting cured film and filter element have good stability. As a result, the performance of a device using the filter element may be improved by alleviating the issue of mura, for example.

Resin (D)

In the present embodiment, the resin (D) may have a bisphenol fluorene structure, and the molecular weight of the resin (D) is 2000 to 20000, preferably 3000 to 7000, and more preferably 4500 to 5000. In other embodiments, the resin (D) may be formed by a monomer represented by the following Formula (D-1) or other suitable monomers. The resin (D) may be formed by a single monomer or may be formed by a plurality of monomers.

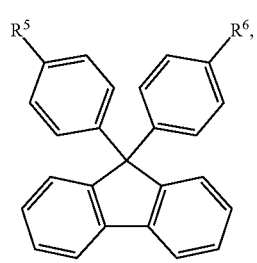

Formula (D-1)

in Formula (D-1), $R^5$ and $R^6$ are respectively a group containing a carbonyl group.

In Formula (D-1), $R^5$ and $R^6$ are preferably a group containing a carbonyl group and a hydroxyl group or a group containing an acrylate group and a hydroxyl group, respectively. Preferred specific examples of the monomer represented by Formula (D-1) include monomers represented by the following Formula (d-1).

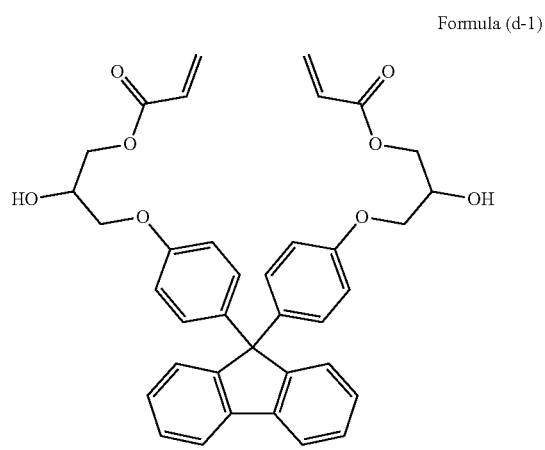 [SMILES: C=CC(=O)OCC(O)COc1ccc(C2(c3ccc(OCC(O)COC(=O)C=C)cc3)c3ccccc3-c3ccccc32)cc1]

Formula (d-1)

When the resin composition includes the resin (D) having a bisphenol fluorene structure and the molecular weight of the resin (D) is 2000 to 20000, the resulting cured film and filter element may have better adhesion. When the resin composition includes the resin (D) formed by a monomer represented by Formula (D-1) and $R^5$ and $R^6$ in Formula (D-1) are respectively a group containing a carbonyl group, the cured film and the filter element prepared by the resin composition have better adhesion, resolution, and developability.

Photoinitiator (E)

The photoinitiator (E) includes an oxime-based photoinitiator (E-1) and an acetophenone-based photoinitiator (E-2). However, the invention is not limited thereto, and the photoinitiator (E) may include other suitable photoinitiators.

The oxime-based photoinitiator (E-1) is not particularly limited, and a suitable oxime-based photoinitiator may be selected according to needs. For example, the oxime-based photoinitiator (E-1) may include Irgacure OXE-01, OXE-02, OXE-03, OXE-04 (trade name; manufactured by BASF) or other suitable oxime-based photoinitiators. The oxime-based photoinitiator may be used alone or in combination.

The acetophenone-based photoinitiator (E-2) is not particularly limited, and a suitable acetophenone-based photoinitiator may be selected according to needs. For example, the acetophenone-based photoinitiator (E-2) may include Irgacure 369E, Chemcure-96 (trade name; manufactured by Chembridge International Corp, Ltd.) or other suitable acetophenone-based photoinitiators. The acetophenone-based photoinitiator may be used alone or in combination.

Based on a total usage amount of 100 parts by weight of the oxime-based photoinitiator (E-1) and the acetophenone-based photoinitiator (E-2), a usage amount of the oxime-based photoinitiator (E-1) may be 50 parts by weight to 70 parts by weight.

Based on a usage amount of 100 parts by weight of the resin (D), the usage amount of the photoinitiator (E) is 4 parts by weight to 12 parts by weight, preferably 6 parts by weight to 12 parts by weight, and more preferably 6 parts by weight to 10 parts by weight.

When the photoinitiator (E) in the resin composition includes the oxime-based photoinitiator (E-1) and the acetophenone-based photoinitiator (E-2) and the usage amount of the oxime-based photoinitiator (E-1) is within the above range, the resulting cured film and filter element may have better resolution.

Additive (F)

The resin composition may further include the additive (F). In the present embodiment, the additive (F) may include a surfactant. The surfactant is not particularly limited, and a suitable surfactant may be selected according to needs. For example, the surfactant may include a fluorine-based surfactant or other suitable surfactants. The fluorine-based surfactant may include Megafac F575, F563, F444 (trade name; perfluoroalkyl ethylene oxide adduct manufactured by DIC). The surfactant may be used alone or in combination. The additive (F) may be used alone or in combination.

Based on a usage amount of 100 parts by weight of the resin (D), the usage amount of the additive (F) is 1 part by weight to 20 parts by weight, preferably 1 part by weight to 10 parts by weight, and more preferably 1 part by weight to 3 parts by weight.

When the resin composition further includes a fluorine-based surfactant as the additive (F), the resulting cured film and filter element may have good coating uniformity.

<Preparation Method of Resin Composition>

The preparation method of the resin composition is not particularly limited. For example, the black coloring agent (A), the ethylenically-unsaturated monomer (B), the solvent (C), the resin (D), and the photoinitiator (E) were placed in a stirrer and stirred to be uniformly mixed into a solution state. If needed, the additive (F) may also be added, and after mixing uniformly, a liquid resin composition was obtained.

<Manufacturing Method of Cured Film>

The cured film was obtained from the resin composition above. In the present embodiment, when the thickness of the cured film was 0.3 microns to 3.0 microns, the resolution of the cured film was less than 2 microns and preferably 0.9 microns to 1.4 microns and more preferably 0.9 microns to 1.1 microns. In other embodiments, a visible light transmittance of the cured film was 5% to 50% when the thickness of the cured film was between 0.3 microns and 3.0 microns. For example, the visible light transmittance of the cured film may be 5%, 10%, or 50%, and the cured film may be applied to a filter element, such that the filter element has a specific light transmittance.

The cured film may be formed by coating the resin composition on a substrate to form a coating film and performing pre-bake, exposure, development, and post-bake on the coating film. For example, after the resin composition was coated on the substrate to form a coating film, pre-bake was performed at a temperature of 90° C. for 2 minutes. Next, the pre-baked coating film was exposed with an I-line exposure machine (wavelength: 365 nm) at 1400 J/m$^2$. Then, development was performed with a developing solution at a temperature of 23° C. for 84 seconds. Next, post-bake was performed at 220° C. for 5 minutes to form a cured film on the substrate.

The substrate may be a glass substrate, a silicon wafer substrate, or a plastic base material (such as a polyether sulfone (PES) board or a polycarbonate (PC) board), and the type thereof is not particularly limited.

The coating method is not particularly limited, but a spray coating method, a roll coating method, a spin coating method, or the like may be used, and in general, a spin coating method is widely used. In addition, a coating film was formed, and then, in some cases, the residual solvent may be partially removed under reduced pressure.

The developing solution is not particularly limited, and a suitable developing solution may be selected according to needs. For example, the developing solution may be tetramethyl ammonium hydroxide (TMAH), and the concentration thereof may be 0.3 wt %.

<Manufacturing Method of Filter Element>

An exemplary embodiment of the invention provides a filter element, which is the above cured film.

The manufacturing method of the filter element may be the same as the above manufacturing method of the cured film, and is not repeated herein.

Hereinafter, the invention is described in detail with reference to examples. The following examples are provided to describe the invention, and the scope of the invention includes the scope in the following patent application and its substitutes and modifications, and is not limited to the scope of the examples.

Examples of Resin Composition and Cured Film

Example 1 to Example 5 and Comparative example 1 to Comparative example 5 of the resin composition and the cured film are described below:

Example 1 a. Resin Composition 145 parts by weight of titanium black with a particle size less than 100 nm, 78 parts by weight of carbon black with a particle size less than 100 nm, 47 parts by weight of dipentaerythritol hexaacrylate, 47 parts by weight of DPHA-40H, 100 parts by weight of Cardo resin (molecular weight: 5300; manufactured by KISCO), 4 parts by weight of Irgacure OXE-04, 4 parts by weight of Irgacure 369E, and 2 parts by weight of Megafac F444 were added to a mixed solvent of 1199 parts by weight of propylene glycol methyl ether acetate and 514 parts by weight of glycol ether, and after stirring uniformly with a stirrer, the resin composition of Example 1 was obtained.

b. Cured Film

Each resin composition prepared in the Examples was coated on a substrate by a spin coating method (spin coater model: TEL-MK8, manufactured by Tokyo Electron Ltd., rotation speed: about 1800 rpm). Then, pre-bake was performed at a temperature of 90° C. for 2 minutes. Then, exposure was performed at 1400 J/m$^2$ using an I-line exposure machine (wavelength: 365 nm) (exposure machine model: FPA-5500 iZa, manufactured by Cannon) to form a semi-finished product. Next, development was performed at a temperature of 23° C. using TMAH having a concentration of 0.3 wt % as a developing solution for 84 seconds. Then, post-bake was performed at 220° C. for 5 minutes to obtain a cured film. The obtained cured films were evaluated by each of the following evaluation methods, and the results thereof are as shown in Table 1.

Example 2 to Example 5 and Comparative Example 1 to Comparative Example 5

The resin compositions of Example 2 to Example 5 and Comparative example 1 to Comparative example 5 were prepared using the same steps as Example 1, and the difference thereof is: the type and the usage amount of the components of the resin compositions were changed (as shown in Table 1). The obtained resin compositions were made into cured films and evaluated by each of the following evaluation methods, and the results thereof are as shown in Table 1.

TABLE 1

| Component | | | Examples | | | | |
|---|---|---|---|---|---|---|---|
| | | | 1 | 2 | 3 | 4 | 5 |
| Black coloring agent (A) (parts by weight) | Titanium black (A-1) | Particle size <100 nm | 145 | 276 | 24 | 144 | — |
| | | Particle size ≥100 nm | — | — | — | — | 75 |
| | Carbon black (A-2) | Particle size <100 nm | 78 | 142 | 13 | 78 | — |
| | | Particle size ≥100 nm | — | — | — | — | 75 |
| Titanium black (A-1)/(titanium black (A-1) + carbon black (A-2)) (wt %) | | | 65 | 66 | 65 | 65 | 50 |
| Ethylenically-unsaturated monomer (B) (parts by weight) | 3 functional groups | Compound shown in Formula (b-1), m + n + p = 3 | — | — | — | — | — |
| | 6 functional groups | Dipentaerythritol hexaacrylate | 47 | 52 | 43 | 47 | 43 |
| | 10 functional groups | Polyfunctional polyurethane acrylate (DPHA-40H) | 47 | 52 | 43 | 47 | 43 |
| | 15 functional groups | Compound shown in Formula (b-2), q + r + s = 15 | — | — | — | — | — |
| Solvent (C) (parts by weight) | C-1 | Propylene glycol monomethyl ether acetate | 1199 | 1838 | 684 | 1194 | 908 |
| | C-2 | Glycol ethers | 514 | 701 | 290 | 512 | 389 |
| Resin (D) (parts by weight) | Molecular weight < 5000 | CAP01 | — | — | — | 100 | — |
| | 5000 ≤ molecular weight ≤ 10000 | KBR series | 100 | 100 | 100 | — | — |
| | Molecular weight > 10000 | KBR series | — | — | — | — | 100 |
| | | Acrylic resin | — | — | — | — | — |
| Photoinitiator (E) (parts by weight) | Oxime-based photoinitiator (E-1) | Irgacure OXE-04 | 4 | 5 | 4 | 4 | 3 |
| | Acetophenone-based photoinitiator (E-2) | Irgacure 369E | 4 | 5 | 4 | 4 | 3 |
| Oxime-based photoinitiator (E-1)/(oxime-based photoinitiator (E-1) + acetophenone photoinitiator (E-2)) (wt %) | | | 50 | 50 | 50 | 50 | 50 |
| Additive (F) (parts by weight) | Fluorine-based surfactant | Megafac F444 | 2 | 3 | 1 | 2 | 2 |
| Evaluation results | | Resolution | ○ | ○ | ○ | ○ | Δ |
| | | Developability | ○ | ○ | ○ | Δ | Δ |
| | | Adhesion | ○ | ○ | ○ | ○ | ○ |
| | | Coating uniformity | ○ | ○ | ○ | ○ | ○ |
| | | Light transmittance | 10% | 5% | 50% | 10% | 10% |

| Component | | | Comparative examples | | | | |
|---|---|---|---|---|---|---|---|
| | | | 1 | 2 | 3 | 4 | 5 |
| Black coloring agent (A) (parts by weight) | Titanium black (A-1) | Particle size <100 nm | 73 | — | — | — | — |
| | | Particle size ≥100 nm | — | 73 | 73 | 75 | 62 |

TABLE 1-continued

| | | | | | | | |
|---|---|---|---|---|---|---|---|
| | Carbon black (A-2) | Particle size <100 nm | 77 | — | — | — | — |
| | | Particle size ≥100 nm | — | 77 | 77 | 75 | 62 |
| | Titanium black (A-1)/(titanium black (A-1) + carbon black (A-2)) (wt %) | | 49 | 49 | 49 | 50 | 50 |
| Ethylenically-unsaturated monomer (B) (parts by weight) | 3 functional groups | Compound shown in Formula (b-1), m + n + p = 3 | — | — | — | 86 | — |
| | 6 functional groups | Dipentaerythritol hexaacrylate | 43 | 43 | 43 | — | 38 |
| | 10 functional groups | Polyfunctional polyurethane acrylate (DPHA-40H) | 43 | 43 | 43 | — | — |
| | 15 functional groups | Compound shown in Formula (b-2), q + r + s = 15 | — | — | — | — | 38 |
| Solvent (C) (parts by weight) | C-1 | Propylene glycol monomethyl ether acetate | 888 | 808 | 888 | 807 | 720 |
| | C-2 | Glycol ethers | 265 | 346 | 265 | 346 | 308 |
| Resin (D) (parts by weight) | Molecular weight < 5000 | CAP01 | — | 100 | — | 100 | 100 |
| | 5000 ≤ molecular weight ≤ 10000 | KBR series | — | — | — | — | — |
| | Molecular weight > 10000 | KBR series | — | — | — | — | — |
| | | Acrylic resin | 100 | — | 100 | — | — |
| Photoinitiator (E) (parts by weight) | Oxime-based photoinitiator (E-1) | Irgacure OXE-04 | 3 | 3 | 3 | 6 | 5 |
| | Acetophenone-based photoinitiator (E-2) | Irgacure 369E | 3 | 3 | 3 | — | — |
| Oxime-based photoinitiator (E-1)/(oxime-based photoinitiator (E-1) + acetophenone photoinitiator (E-2)) (wt %) | | | 50 | 50 | 50 | 100 | 100 |
| Additive (F) (parts by weight) | Fluorine-based surfactant | Megafac F444 | 1 | 1 | 1 | 1 | 1 |
| Evaluation results | | Resolution | Δ | Δ | X | Δ | X |
| | | Developability | ○ | Δ | Δ | Δ | X |
| | | Adhesion | X | X | X | Δ | ○ |
| | | Coating uniformity | Δ | X | X | X | X |
| | | Light transmittance | 10% | 10% | 10% | 10% | 10% |

In Table 1, the structure of the ethylenically-unsaturated monomer (B) having three functional groups may be a compound represented by the following Formula (b-1), wherein m+n+p=3 (trade name: NK ESTER A-TMPT-3EO, manufactured by Shin Nakamura Chemical Co., Ltd.) The structure of the ethylenically-unsaturated monomer (B) having 15 functional groups may be a compound represented by the following Formula (b-2), wherein q+r+s=15 (trade name: TP-153, manufactured by Hannong Chemical Co., Ltd.)

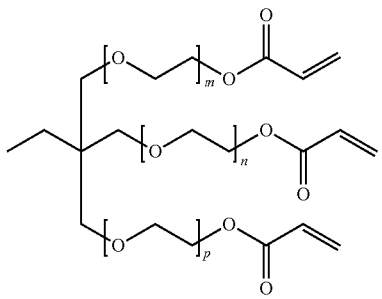

Formula (b-1)

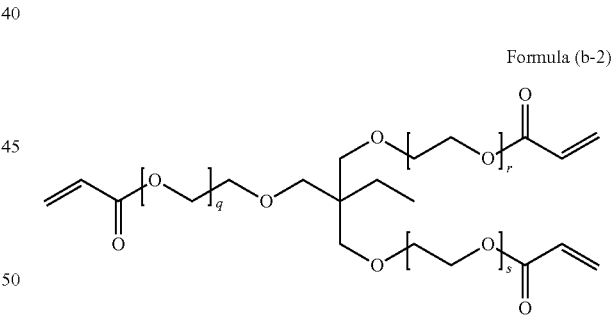

Formula (b-2)

In Table 1, the structure of Cardo resin CAP01 (molecular weight: 4393; manufactured by MIWON) having a molecular weight less than 5000 may be a structure represented by the following Formula (d-2), wherein r is about 4.

Formula (d-2)
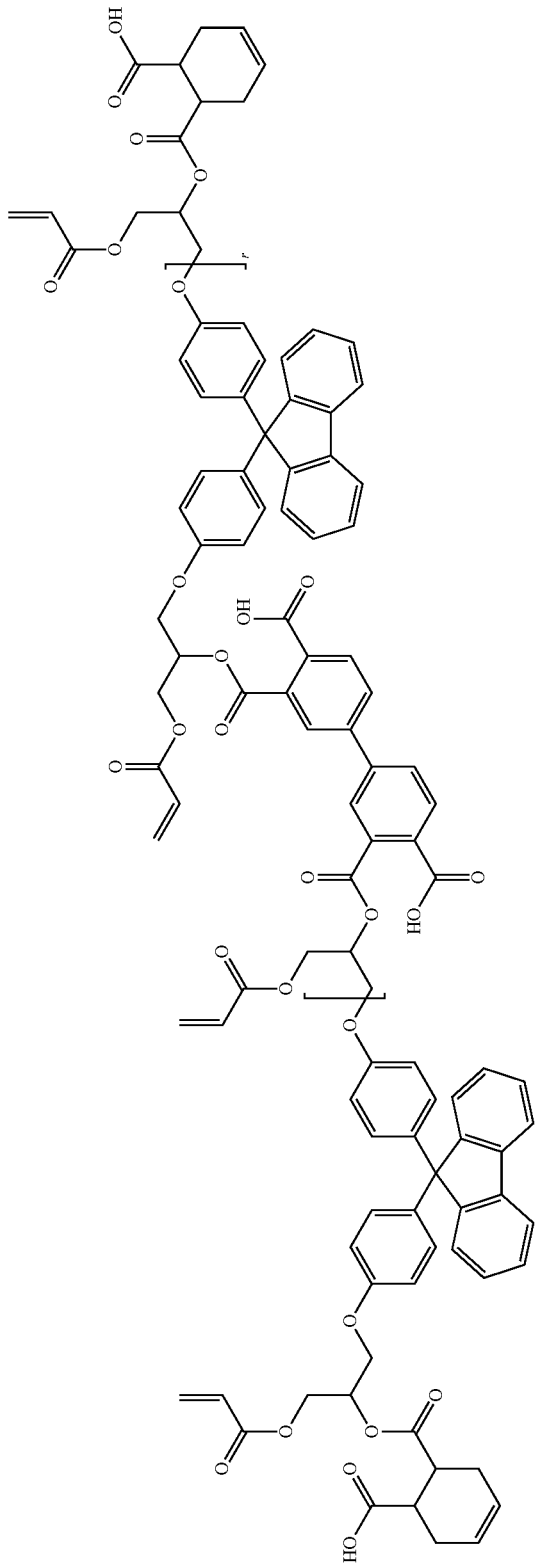

In Table 1, the molecular weight of KBR series (trade name; manufactured by KISCO) having a molecular weight between 5000 and 10000 may be 5300, and the molecular weight of KBR series (trade name; manufactured by KISCO) having a molecular weight greater than 10000 may be 16797.

Evaluation Methods a. Resolution

The prepared cured film (thickness: 0.4 µm) was observed for the integrity of the dot pattern in an area with a critical size of 1 µm via a Critical Dimension Scanning Electron Microscope (CD-SEM) (Model: S-8840, manufactured by Hitachi) at a magnification of 45K to evaluate resolution. When the outline of the pattern was more complete, the cured film had good resolution.

The evaluation criteria of resolution are as follows:
  ○: complete pattern outline;
  Δ: outline of pattern slightly protruding or missing corner without affecting actual application;
  X: incomplete pattern outline.

b. Developability

The prepared cured film (thickness: 0.4 µm) was observed for residue in an unexposed area in an area with a critical size of 1 µm via a Critical Dimension Scanning Electron Microscope (CD-SEM) (Model: S-8840, manufactured by Hitachi) at a magnification of 35K to evaluate developability. When the residue was less, the cured film had good developability.

The evaluation criteria of developability are as follows:
  ○: no residue;
  Δ: slight residue without affecting practical application;
  X: significant residue.

c. Adhesion

The minimum size of the pattern width of the pattern without peeling was observed under 50 times magnification of the prepared cured film (thickness: 0.4 µm) via an optical microscope (model: BH3-SIC6, manufactured by Olympus) to evaluate adhesion. The smaller the width of the pattern without peeling, the better the adhesion of the cured film.

The evaluation criteria of adhesion are as follows:
  ○: 1 µm≤pattern width<2 µm;
  Δ: 2 µm≤pattern width<3 µm;
  X: 3 µm≤pattern width.

d. Coating Uniformity

The prepared cured film (thickness: 0.4 µm) was measured for transmittance at a wavelength of 400 nm to 700 nm via a colorimeter (model: MCPD-3000, manufactured by Otsuka Electronics) at 13 points on the film to calculate the deviation (3-sigma). The initial measured value and the measured value three weeks after were recorded and the deviation values were respectively calculated, and the difference between the deviation values before and after the three weeks were compared to evaluate coating uniformity.

The evaluation criteria of coating uniformity are as follows:
  ○: intra-film transmittance deviation<0.5%;
  Δ: 0.5%≤intra-film transmittance deviation≤1%;
  X: 1%<intra-film transmittance deviation.

e. Light Transmittance

The prepared cured film (thickness: 0.4 µm) was measured for transmittance at a wavelength of 400 nm 700 nm at 13 points on the film via a colorimeter (model: MCPD-3000, manufactured by Otsuka Electronics Co., Ltd.), and the average value of the transmittance obtained is the light transmittance shown in Table 1.

Evaluation Results

As may be seen from Table 1, the resin composition contains the black coloring agent (A) including the titanium black (A-1) and the carbon black (A-2), and based on a total usage amount of 100 parts by weight of the titanium black (A-1) and the carbon black (A-2), the cured films formed in Examples 1 to 5 in which the usage amount of the titanium black (A-1) is 50 parts by weight to 75 parts by weight has good resolution, developability, adhesion, coating uniformity, and light transmittance and may be applied to a filter element. On the other hand, the adhesion and coating uniformity of the cured films formed in Comparative examples 1 to 3 in which the usage amount of the titanium black (A-1) in the resin composition is out of the above range are not good.

In addition, compared to the cured film (Example 5) prepared with the titanium black (A-1) and the carbon black (A-2) having a particle size greater than or equal to 100 nm in the resin composition, the cured films (Examples 1 to 4) prepared with the titanium black (A-1) and the carbon black (A-2) having a particle size less than 100 nm in the resin composition have a more complete pattern outline. Therefore, when the titanium black (A-1) and the carbon black (A-2) having a particle size less than 100 nm are used, the cured film formed by the resin composition may have better resolution.

In addition, compared to the cured film (Comparative example 4) prepared by the ethylenically-unsaturated monomer (B) without 4 to 14 functional groups in the resin composition, wherein the functional groups include at least one of an ester group, an acyl group, an acyloxy group, and an amide group, the cured films (Examples 1 to 5) prepared by the ethylenically-unsaturated monomer (B) including 4 to 14 functional groups in the resin composition have a smaller pattern width and lower intra-film transmittance deviation. Therefore, when the ethylenically-unsaturated monomer (B) having 4 to 14 functional groups is used, wherein the functional groups include at least one of an ester group, an acyl group, an acyloxy group, and an amide group, the cured films formed by the resin composition may have better adhesion and resolution.

In addition, based on a usage amount of 100 parts by weight of the resin (D), compared to the cured film (Comparative example 5) prepared by the resin composition in which the ethylenically-unsaturated monomer (B) has a usage amount of 76 parts by weight, the cured films (Examples 1 to 5) prepared by the resin composition in which the ethylenically-unsaturated monomer (B) has a usage amount of 78 parts by weight to 115 parts by weight have a more complete pattern outline, less residue, and lower intra-film transmittance deviation. Therefore, when the usage amount of the ethylenically-unsaturated monomer (B) is 78 parts by weight to 115 parts by weight, the cured films formed by the resin composition may have better adhesion, resolution, and developability.

In addition, compared to the cured films (Comparative examples 1 and 3) prepared by the resin composition in which the resin (D) does not have a bisphenol fluorene structure, the cured films (Examples 1 to 5) prepared by the resin composition in which the resin (D) has a bisphenol fluorene structure and the resin (D) has a molecular weight of 2000 to 20000 have a smaller pattern width and lower intra-film transmittance deviation. Therefore, when the resin (D) having a bisphenol fluorene structure is used and the molecular weight of the resin (D) is 2000 to 20000, the cured films formed by the resin composition may have better adhesion. When the resin composition includes the resin (D) formed by a monomer represented by Formula (D-1) and $R^5$ and $R^6$ in Formula (D-1) are respectively a group containing a carbonyl group, the cured films formed by the resin composition may also have better adhesion, resolution, and developability.

In addition, when the resin (D) in the resin composition has a bisphenol fluorene structure, compared to the cured film (Example 4) prepared by the resin (D) having a molecular weight between 5000 and 10000 and the cured film (Example 5) prepared by the resin (D) having a molecular weight greater than 10000, the cured films (Examples 1 to 3) prepared by the resin (D) having a molecular weight less than 5000 have a more complete pattern outline or less residue. Therefore, when the resin (D) having a bisphenol fluorene structure is used and the molecular weight range of the resin (D) is greater than or equal to 5000 and less than or equal to 10000, the cured films formed by the resin composition may have better developability or resolution.

In addition, compared to the cured films (Comparative examples 4 and 5) prepared by the resin composition in which the photoinitiator (E) does not include the acetophenone-based photoinitiator (E-2), the cured films (Examples 1 to 5) prepared by the resin composition in which the photoinitiator (E) includes the oxime-based photoinitiator (E-1) and the acetophenone-based photoinitiator (E-2), wherein based on a usage amount of 100 parts by weight of the resin (D), the usage amount of the photoinitiator (E) is 4 parts by weight to 12 parts by weight, have less intra-film transmittance deviation. Therefore, when the photoinitiator (E) including the oxime-based photoinitiator (E-1) and the acetophenone-based photoinitiator (E-2) is used and the usage amount of the oxime-based photoinitiator (E-1) is within the above range, the cured films formed by the resin composition may have better resolution.

Based on the above, the resin composition of the invention contains the black coloring agent (A) including the titanium black (A-1) and the carbon black (A-2), and based on a total usage amount of 100 parts by weight of the titanium black (A-1) and the carbon black (A-2), when the usage amount of the titanium black (A-1) is 50 parts by weight to 75 parts by weight, the cured films formed by the resin composition may have good resolution, developability, adhesion, coating uniformity, and light transmittance, and may be applied to a filter element, thus improving the performance of a device using the filter element.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A resin composition comprising:
   a black coloring agent (A);
   an ethylenically-unsaturated monomer (B);
   a solvent (C);
   a resin (D);
   a photoinitiator (E); and
   a fluorine-based surfactant (F),
   wherein the black coloring agent (A) comprises a titanium black (A-1) and a carbon black (A-2) each having a particle size of less than 100 nm, and based on a total usage amount of 100 parts by weight of the titanium black (A-1) and the carbon black (A-2), a usage amount of the titanium black (A-1) is 50 parts by weight to 75 parts by weight,
   wherein based on a usage amount of 100 parts by weight of the resin (D), a usage amount of the black coloring agent (A) is 25 parts by weight to 430 parts by weight, a usage amount of the ethylenically-unsaturated monomer (B) is 78 parts by weight to 115 parts by weight, a usage amount of the solvent (C) is 965 parts by weight to 2550 parts by weight, a usage amount of the photoinitiator (E) is 4 parts by weight to 12 parts by weight, and a usage amount of the fluorine-based surfactant (F) is 1 part by weight to 3 parts by weight,
   wherein the resin (D) is formed by a monomer represented by the following Formula (d-1),

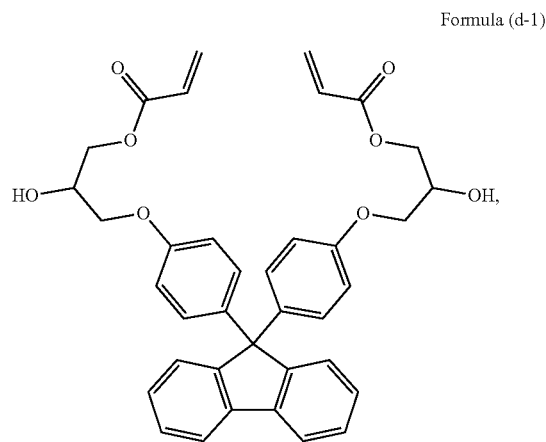 [SMILES: C=CC(=O)OCC(O)COc1ccc(C2(c3ccc(OCC(O)COC(=O)C=C)cc3)c3ccccc3-c3ccccc32)cc1]

Formula (d-1)

wherein the ethylenically-unsaturated monomer (B) comprises dipentaerythritol hexaacrylate and a polyfunctional polyurethane acrylate having 10 or more functional groups,
   wherein the solvent (C) comprises at least one of a compound represented by the following Formula (C-1) and a compound represented by the following Formula (C-2),

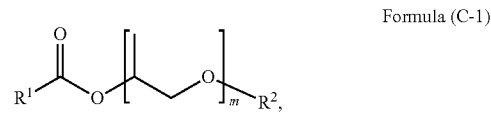

Formula (C-1)

in Formula (C-1), $R^1$ and $R^2$ are respectively an alkyl group, and m is 1 or 2,

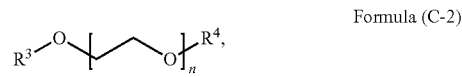

Formula (C-2)

in Formula (C-2), $R^3$ and $R^4$ are respectively an alkyl group, and n is an integer greater than or equal to 1, and
   wherein the photoinitiator (E) comprises an oxime-based photoinitiator (E-1) and an acetophenone-based photoinitiator (E-2),
   such that a resolution, as determined by a smallest dimension of an area with complete pattern integrity of a dot pattern of a cured film obtained after coating the resin composition on a substrate to form a coating film, pre-baking the coating film, exposuring the pre-baked coating film with an I-line exposure machine at a wavelength of 365 nm, developing and patterning the exposed pre-baked coating film with a developing solution, and then post-baking the patterned-developed-exposured pre-baked coating film to form the cured film, is 0.9 to 1.1 microns when a thickness of the cured film is 0.3 micron to 3.0 microns, and a visible light transmittance of the cured film is 5% to 50% with an intra-film transmittance deviation of less than 0.5% when the thickness of the cured film is between 0.3 micron and 3.0 microns.

2. The resin composition of claim 1, wherein a molecular weight of the resin (D) is 2000 to 20000.

3. The resin composition of claim 1, wherein based on a total usage amount of 100 parts by weight of the oxime-based photoinitiator (E-1) and the acetophenone-based photoinitiator (E-2), a usage amount of the oxime-based photoinitiator (E-1) is 50 parts by weight to 70 parts by weight.

4. A filter element formed by the resin composition of claim 1.

5. A resin composition comprising:
a black coloring agent (A);
an ethylenically-unsaturated monomer (B);
a solvent (C);
a resin (D);
a photoinitiator (E)); and
a fluorine-based surfactant (F),
wherein the black coloring agent (A) comprises a titanium black (A-1) and a carbon black (A-2) each having a particle size of less than 100 nm, and based on a total usage amount of 100 parts by weight of the titanium black (A-1) and the carbon black (A-2), a usage amount of the titanium black (A-1) is 50 parts by weight to 75 parts by weight,
wherein based on a usage amount of 100 parts by weight of the resin (D), a usage amount of the black coloring agent (A) is 25 parts by weight to 430 parts by weight, a usage amount of the ethylenically-unsaturated monomer (B) is 78 parts by weight to 115 parts by weight, a usage amount of the solvent (C) is 965 parts by weight to 2550 parts by weight, a usage amount of the photoinitiator (E) is 4 parts by weight to 12 parts by weight, and a usage amount of the fluorine-based surfactant (F) is 1 part by weight to 3 parts by weight,
wherein the resin (D) is formed by a monomer represented by the following Formula (d-1), Formula (d-1)

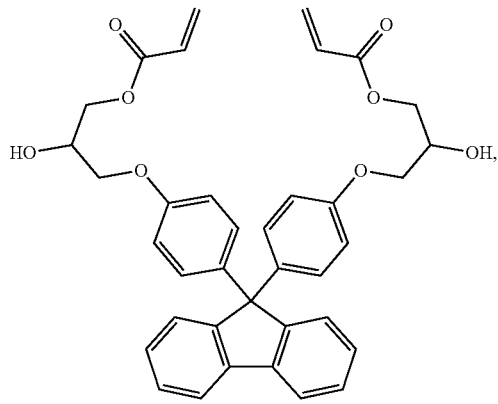

wherein the ethylenically-unsaturated monomer (B) comprises dipentaerythritol hexaacrylate and a polyfunctional polyurethane acrylate having 10 or more functional groups, wherein the solvent (C) comprises at least one of a compound represented by the following Formula (C-1) and a compound represented by the following Formula (C-2), Formula (C-1)

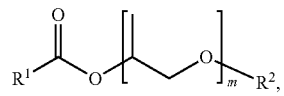

in Formula (C-1), $R^1$ and $R^2$ are respectively an alkyl group, and m is 1 or 2, Formula (C-2)

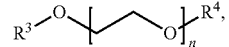

in Formula (C-2), $R^3$ and $R^4$ are respectively an alkyl group, and n is an integer greater than or equal to 1, and wherein the photoinitiator (E) comprises an oxime-based photoinitiator (E-1) and an acetophenone-based photoinitiator (E-2), such that a resolution, as determined by a smallest dimension of an area with complete pattern integrity of a dot pattern of a cured film obtained after coating the resin composition on a substrate to form a coating film, pre-baking the coating film, exposuring the pre-baked coating film with an I-line exposure machine at a wavelength of 365 nm, developing and patterning the exposed pre-baked coating film with a developing solution, and then post-baking the patterned-developed-exposured pre-baked coating film to form the cured film, is 0.9 to 1.1 microns when a thickness of the cured film is 0.3 micron to 3.0 microns, and a light transmittance of the cured film at a visible wavelength of 400 nm to 700 nm is 5% to 50% with an intra-film transmittance deviation of less than 0.5% when the thickness of the cured film is between 0.3 micron and 3.0 microns.

* * * * *